United States Patent
McDermott et al.

(10) Patent No.: US 12,527,940 B2
(45) Date of Patent: Jan. 20, 2026

(54) ARTICULATING SHAFT FOR A STEERABLE CATHETER SYSTEM, CATHETER, AND FABRICATION METHOD

(71) Applicant: Creganna Unlimited Company, Galway (IE)

(72) Inventors: Bernard McDermott, Galway (IE); Adam Szczepanski, Galway (IE); Richard Phelan, Galway (IE); Damian Muldoon, Galway (IE)

(73) Assignee: Creganna Unlimited Company, Galway (IE)

( * ) Notice: Subject to any disclaimer, the term of this patent is extended or adjusted under 35 U.S.C. 154(b) by 958 days.

(21) Appl. No.: 17/546,637

(22) Filed: Dec. 9, 2021

(65) Prior Publication Data

US 2022/0176075 A1    Jun. 9, 2022

(30) Foreign Application Priority Data

Dec. 9, 2020 (EP) .................................. 20212622

(51) Int. Cl.
*A61M 25/01* (2006.01)
*A61M 25/00* (2006.01)

(52) U.S. Cl.
CPC .... *A61M 25/0147* (2013.01); *A61M 25/0009* (2013.01); *A61M 25/0138* (2013.01)

(58) Field of Classification Search
CPC .......... A61M 25/0147; A61M 25/0009; A61M 25/0138; A61M 25/0133; A61M 2025/0161; A61B 1/0011; A61B 1/008; A61B 1/0055

See application file for complete search history.

(56) References Cited

U.S. PATENT DOCUMENTS

| | | | |
|---|---|---|---|
| 5,368,564 A | 11/1994 | Savage | |
| 5,916,147 A | 6/1999 | Boury | |
| 8,016,784 B1 | 9/2011 | Hayzelden et al. | |
| 2005/0075538 A1* | 4/2005 | Banik | A61B 1/0052 600/152 |

(Continued)

FOREIGN PATENT DOCUMENTS

| | | |
|---|---|---|
| JP | 2006521882 W | 9/2006 |
| JP | 201275660 A | 4/2012 |

(Continued)

OTHER PUBLICATIONS

Extended European Search Report, App No. 20212622.3-1126, dated May 6, 2021, 10 pages.

(Continued)

*Primary Examiner* — Cris L. Rodriguez
(74) *Attorney, Agent, or Firm* — Barley Snyder

(57) ABSTRACT

An articulating shaft for a steerable catheter system includes a tubular body having a longitudinal central axis and at least one main lumen with a distal end and a proximal end. The shaft further includes at least one wire support element forming at least one wire lumen for supporting at least one actuating wire, the main lumen and the wire lumen are integrally formed in an extrusion part having a uniform hardness in an axial and a radial direction. A plurality of removed sections or cuts of the shaft extend in a radial direction and are distanced from each other in an axial direction.

14 Claims, 13 Drawing Sheets

(56) References Cited

U.S. PATENT DOCUMENTS

| | | |
|---|---|---|
| 2008/0194911 A1 | 8/2008 | Lee |
| 2012/0209073 A1 | 8/2012 | McWeeney et al. |
| 2015/0202410 A1* | 7/2015 | Odeh ................ A61M 25/0138 |
| | | 604/95.04 |
| 2017/0224956 A1 | 8/2017 | Melsheimer |
| 2018/0021546 A1 | 1/2018 | McDermott et al. |
| 2018/0228346 A1* | 8/2018 | Sekowski ............ A61B 1/0052 |
| 2020/0046209 A1* | 2/2020 | Fancher .................. A61B 1/05 |

FOREIGN PATENT DOCUMENTS

| | | |
|---|---|---|
| WO | 2004086957 A2 | 10/2004 |
| WO | 2020106705 A1 | 5/2020 |

OTHER PUBLICATIONS

Indian Office Action, Application No. 202144056406, Dated: Jun. 27, 2022, 6 pages.

Office Action from Japan's Patent Office dated Feb. 7, 2023, corresponding to Application No. 2021-197620 with English translation, 16 pages.

\* cited by examiner

ARTICULATING SHAFT FOR A STEERABLE CATHETER SYSTEM, CATHETER, AND FABRICATION METHOD

CROSS-REFERENCE TO RELATED APPLICATIONS

This application claims the benefit of European Patent Application No. 20212622.3 filed on Dec. 9, 2020, the whole disclosure of which is incorporated herein by reference in its entirety.

FIELD OF THE INVENTION

The present disclosure relates to medical devices, and more particularly, to a steerable catheter system.

BACKGROUND

Endoscopes are inserted through small incisions or through natural orifices in order to examine internal organs of the body. They are typically long slender and flexible sheaths with a camera or fiber optic bundle and lens system to relay images to the user, and a lighting system to illuminate the internal structures. They typically have a steering system to deflect the tip in tight bend radius either in one, two or all directions to allow the user to position the tip where required. Endoscopes generally have other working lumens or passages depending on their type: For instance, one or more lumens are provided for the passage of biopsy and therapeutic instruments, for irrigation of the tip to clean the lenses, for aspiration of bodily fluids and for passage of air to insufflate body cavities to create space. Therapeutic endoscopy is an endoscopic procedure during which treatment is carried out via the endoscope. Diagnostic endoscopy is used to visualize a part of the gastrointestinal, respiratory, or urinary tract in order to aid diagnosis.

Endoscopes are generally reusable and are designed to perform a high number of procedures and survive a sterilization process after each procedure. This results in a high acquisition cost and high costs associated with disinfection, maintenance, and repair.

There remains a need for a disposable device which is cost effective to produce, while maintaining desired performance.

SUMMARY

An articulating shaft for a steerable catheter system according to the present disclosure includes a tubular body having a longitudinal central axis and at least one main lumen with a distal end and a proximal end. The shaft further includes at least one wire support element forming at least one wire lumen sized to support at least one actuating wire, the main lumen and the wire lumen are integrally formed in an extrusion part having a uniform hardness in an axial and a radial direction. A plurality of removed sections or cuts of the shaft extend in a radial direction and are distanced from each other in an axial direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
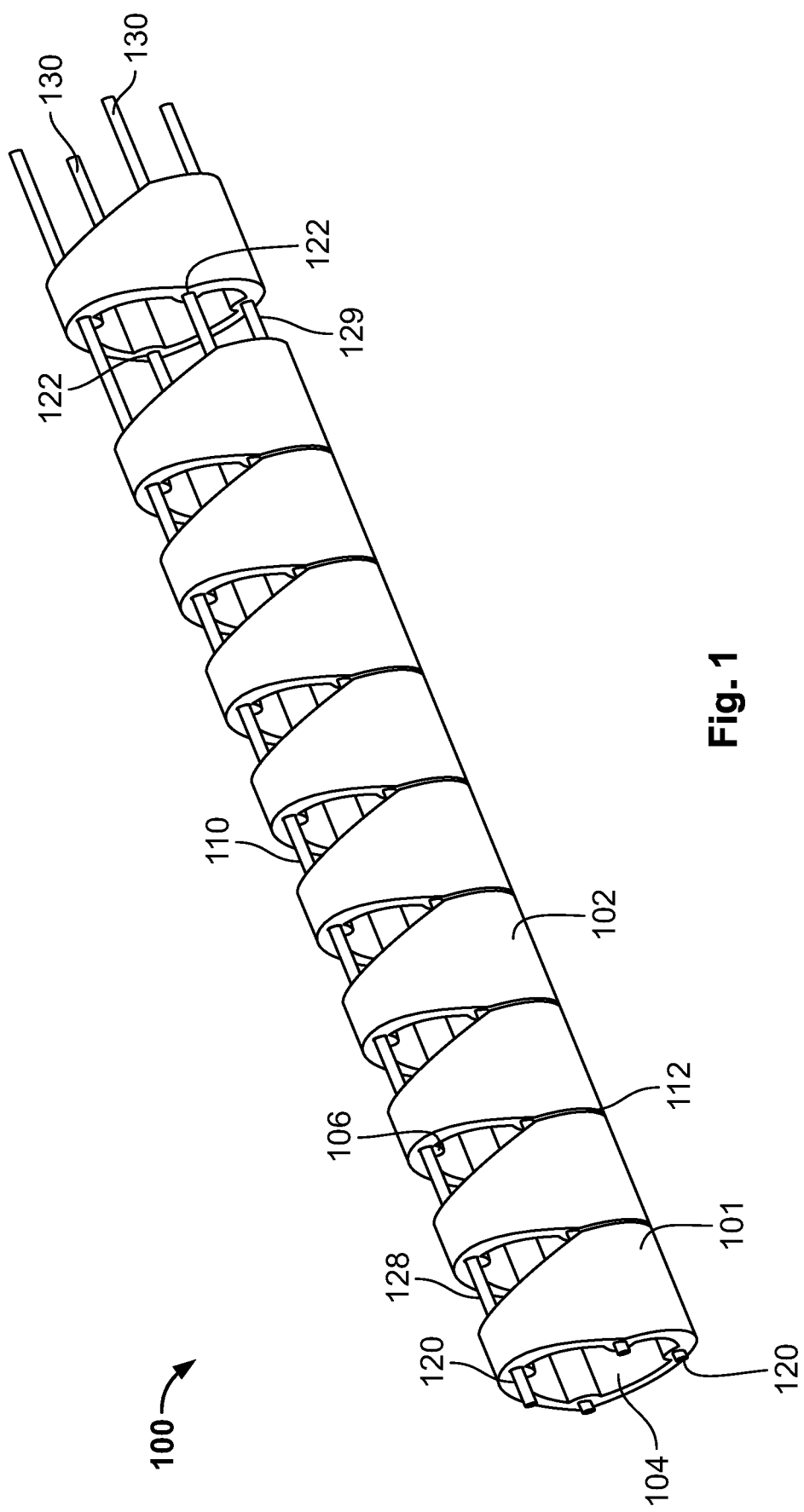
FIG. 1 is a schematic perspective representation of an articulating shaft according to a first example.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
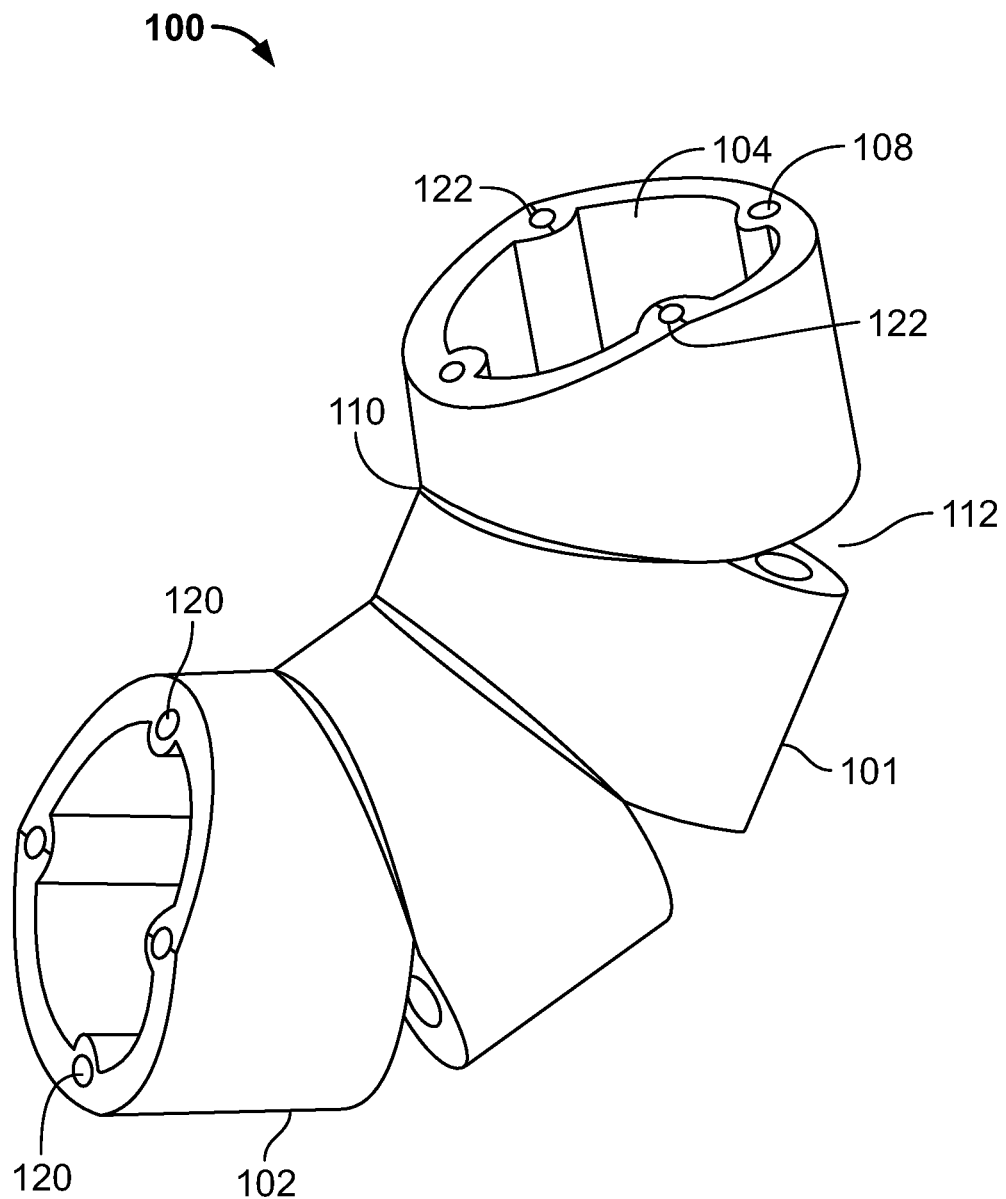
FIG. 2 is a detail of FIG. 1.
Figure 3:
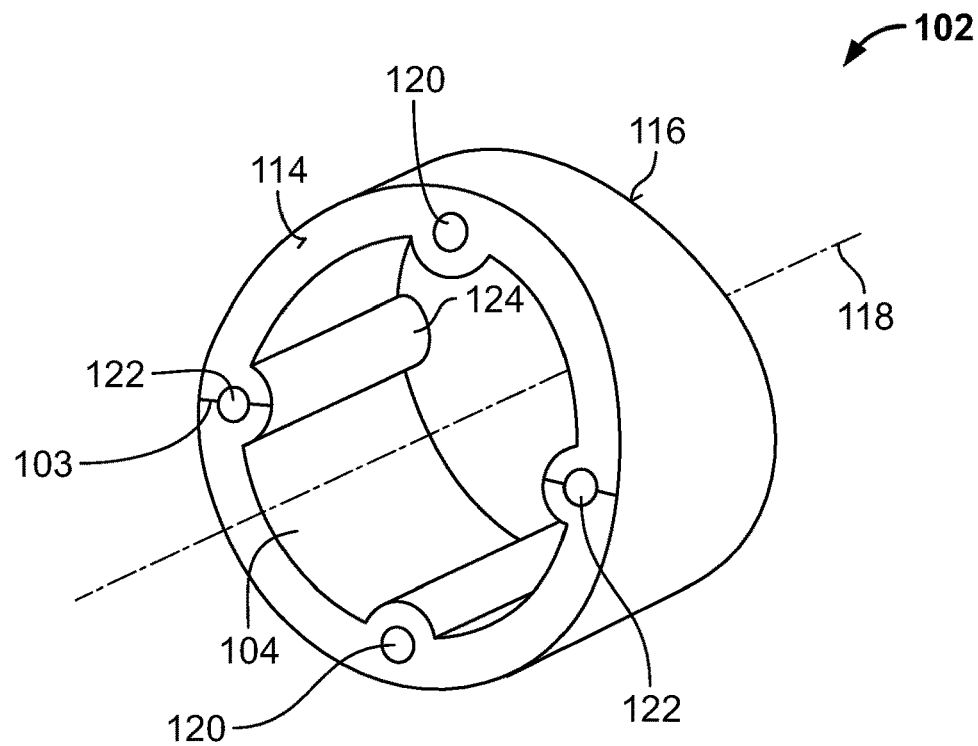
FIG. 3 is a further detail of FIG. 1.

The present invention will now be explained in more detail with reference to the figures and firstly referring to FIGS. 1 to 3. FIG. 1 shows a schematic perspective representation of an articulating shaft 100 according to a first example of the present disclosure. FIG. 2 shows a part of the articulating shaft 100 in a bent state. FIG. 3 is a perspective view of one of a plurality of segments 102 being part of the shaft 100. It should be noted that in the drawings the steering wires and other elements that are inserted into the various cavities or lumens are not shown in FIGS. 2 and 3.

Figure 14:
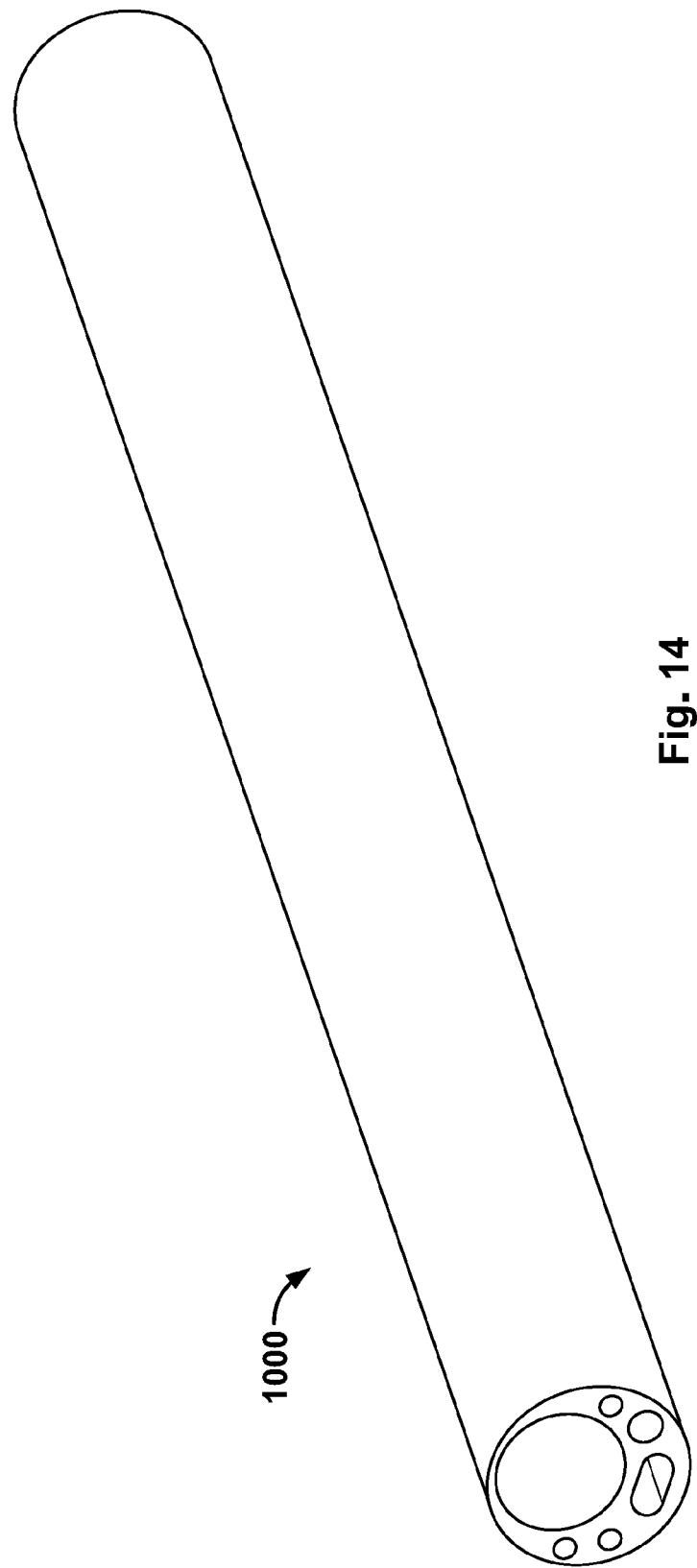
FIG. 14 is a schematic perspective representation of a multilumen extrusion.

According to the present disclosure, a tubular body 101 of the articulating shaft 100 is fabricated from one single durometer extrusion part, having all passageways or lumens that are required. Such an extrusion part is referred to a multilumen extrusion (MLE). FIG. 14 shows an example of an MLE 1000 with six lumens. The single durometer extrusion can be cut in various ways to modify its flexibility along the length as required, from a relatively stiff and pushable proximal section with non to minimal cutting, to a highly flexible distal steerable section with wide openings.

The extrusion can be made with multiple lumens to guide and position the necessary pull wires required for articulation, axial support wires to provide increased axial support and to reinforce or provide hinges for the bending of the sections. Additional lumens can be easily provided in the manufacture of the MLE to guide and position other elements needed in the construction of the devices using such a construction, for instance leads, fiber optic cables, working channels etc. This construction results in a steerable sheath composed of a minimal number of components.

According to the example shown in FIG. 1, a main lumen 104 extends along the complete length of the shaft 100. The articulating shaft 100 comprises steering wire support elements 106 with feed-through openings 108. The feed-through openings 108 are linearly arranged in a longitudinal direction of the shaft 100, so that segmented lumens 120 for a steering wire 128 is formed. Due to the particular shape of the segments 102, first removed sections or cuts 110 are formed between adjacent segments 102. These removed sections or cuts 110 facilitate the bending of the articulating shaft 100, if a steering wire is inserted into the row of feed-through openings 108 and exerts bending forces on the shaft 100. The presence of the second removed sections or cuts 112 arranged opposite to the first removed sections or cuts 110 allows the outer surface of the shaft 100 to elongate to facilitate articulation.

As can be seen in FIG. 3, each segment 102 has an essentially cylindrical shape with a first and a second lateral face 114, 116 delimiting the segment 102 in an axial direction, wherein the lateral faces are at partly inclined to the longitudinal axis at an angle different from 90°. In FIG. 3, the lower halves of the first and the second lateral face 114, 116, respectively, are orthogonal to the longitudinal axis, while the upper halves of the lateral faces 114, 116 are forming an angle deviating from 90° by about 20°. As is apparent from the depiction of an unbent shaft 100 shown in FIG. 1, these slanted parts of the lateral faces form wedge shaped removed sections or cuts 110 between the adjacent segments 102.

The segments 102 comprise four wire support elements, which are equally distanced around the circumference of the shaft 100 around the longitudinal axis 118. The feed-through openings are aligned along the longitudinal axis 118 to form four lumens, two of them being steering wire lumens 120. The steering wire lumens 120 contain the steering wires 128, 129 used for articulation.

The shaft 100 according to the first example further comprises reinforcement lumens 122 for receiving the axial support wires. These axial support wires may for instance be made from steel, Nitinol, or other suitable materials having some elastic properties. The axial support wires may also be referred to as the neutral axis support wires because they stabilize the segments 102 formed by the removed sections or cuts 110, 112 in their alignment and position. When a tensile load is applied, the actuating wire shortens and causes the openings 110 to close, thereby causing the assembly to bend in the direction of the openings 110. The neutral axis support wires 130 arranged in the reinforcement lumens 122 also bend in order to allow the assembly to move. The reinforcement wires also carry some of the articulation axial load and keep tension on the assembly, thereby preventing the segments from separating. Advantageously, the neutral axis support wires 130 are arranged at 90° spacing to the pull wires 128, 129.

In the illustrated embodiment, two axial support wire lumens 122 are provided. It is clear for a person skilled in the art, however, that any other number of lumens may also be provided. Further, also additional lumens for electrical or optical cables or fluid channels can be provided.

In the illustrated example, the shaft 100 has an essentially circular outer contour. However, any other cross-sectional outline may also be chosen, for instance an oval or polygonal contour. As shown, all openings forming a lumen have a circular cross-section. This is not necessarily the case; any other suitable cross-section, e.g. oval or polygonal, may also be used.

According to an advantageous aspect of the present disclosure, the main lumen 104 takes up most of the cross-sectional area of the shaft 100. In particular, the walls 124 delimiting the steering wire lumens 120 and the reinforcement lumens 122 bulge into the main lumen 104.

Figure 4:
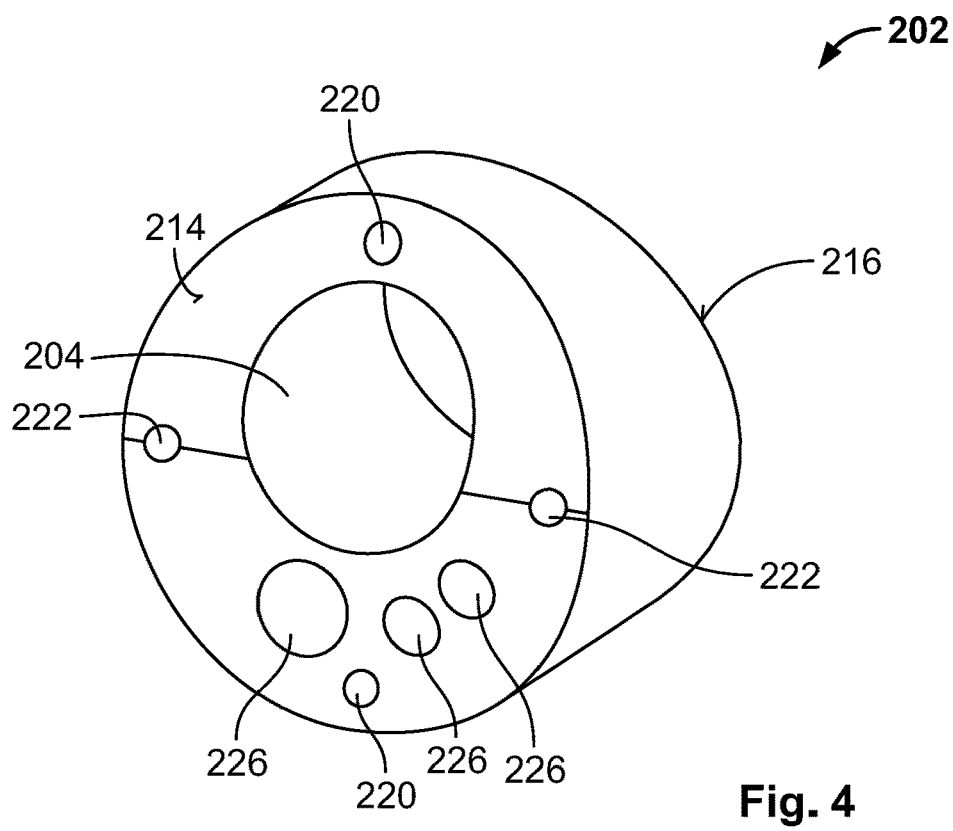
FIG. 4 is a schematic perspective representation of a segment of an articulating shaft according to a further example.

FIGS. 1-3 show a tubular body fabricated from an MLE with one single internal working lumen 104. If additional lumens, e.g. for electric cabling are needed, the main lumen 204 may also be arranged off-center, as is shown in FIG. 4. The outer contour of the segment 202 is identical to the outer contour of the segment 202 shown in FIG. 3. However, the main lumen 204 is arranged closer to one of the steering wire lumens 220, leaving room for further lumens 226. The additional lumens are provided for electrical leads, fiber optic cables, etc. They can be arranged as required by the required device functions.

Reverting to FIG. 1-3, as mentioned above, the tubular body 101 is fabricated as one integral MLE, wherein the distal end of the extrusion has openings 110, 112 made in a direction normal to the axis of the extrusion. These openings (also referred to as removed sections or cuts) are made in such a way as to allow the distal end to bend in the direction of the openings. These openings effectively divide the extrusion into small sections, each joined to its adjacent segment with a thin strip of material which effectively works as a hinge. However, the segments 102 may also be separated from each other completely.

A pull wire is fitted into the pull wire lumen and fixed at the distal end segment. When this pull wire is pulled through the lumen at the proximal end it reduces the length of wire in the lumen and this has the effect of closing the openings. This causes the distal end to bend into a minimum radius curve defined by the opening size.

As indicated schematically in FIG. 1, the individual segments 102 are aligned along the longitudinal axis 118 of the shaft 100 and kept in position by the steering wires 128, 129 and the neutral axis support wires 130. The wedge-shaped first removed sections or cuts 110 facilitate bending of the shaft 100 when the steering wire 128 is pulled and thereby shortened. On the other hand, the narrow removed sections or cuts 112, which are formed by the abutting individual segments 102, open as shown in FIG. 1 and reduce the mechanical resistance against bending. The walls 124 bulge into the main lumen 104, thereby reducing the overall material thickness of the cross section of the shaft 100. This allows for a particularly light weight shaft and a maximized cross sectional area of the main lumen 104.

For fabricating the articulating shaft 100, the multi lumen extrusion forming the tubular body 101 is provided with openings 110 made on one side approximately 170° circumferentially, terminating by an equal amount from the neutral axis, thereby leaving a small amount of uncut material connecting each segment and forming a polymer hinge between the segments. This polymer hinge is not visible in the drawings. Further cuts 112 are made on the other side aligning in an axial direction with the centers of the openings 110 on the first side. These cuts are also made approximately 170° circumferentially, terminating by an equal amount from the neutral axis and forming the other side of the polymer hinges. The openings 110 are shaped in such a way as to allow the sheath to curve in a defined radius when the pull wire is shortened relative to the sheath, as can be seen in FIG. 2.

The cuts 112 on the radially opposite side of the openings 110 allow the extrusion 101 to open on that side and allowing the outer surface of the MLE to effectively elongate to enable the bend to be made. The remaining material between the ends of the cuts 112 and the ends of the openings 110 is effectively the hinge 103 around which the segments 102 bend.

A pull wire 128 is inserted into the pull wire lumen 120. As the hinges 103 are necessarily of small width to allow articulation, neutral axis support wire lumens 122 can be provided. Flexible neutral axis support wires 130 are fitted into these lumens and fixed distally and proximally of the flexible section. These wires 130 can be made from stainless steel, Nitinol, or another flexible and axially stiff material. These wires 130 reinforce the flexible joints and provide high axial stiffness to the assembly to reduce axial compression under pull wire loads fed into the distal end. This improves articulation accuracy and precision. Furthermore, the neutral axis support wires 130 provide high column strength to the polymer hinges 103 to prevent possible buckling under axial loads. The wires 130 also provide elasticity to the system to provide springback of the distal tip during articulation.

Furthermore, the wires 130 can also provide a connection between the segments 102 so that the construction can be achieved using segments 102 with minimal polymer hinges 103 or even can be achieved with discrete separate segments 102 assembled on to the wires 130.

Figure 5:
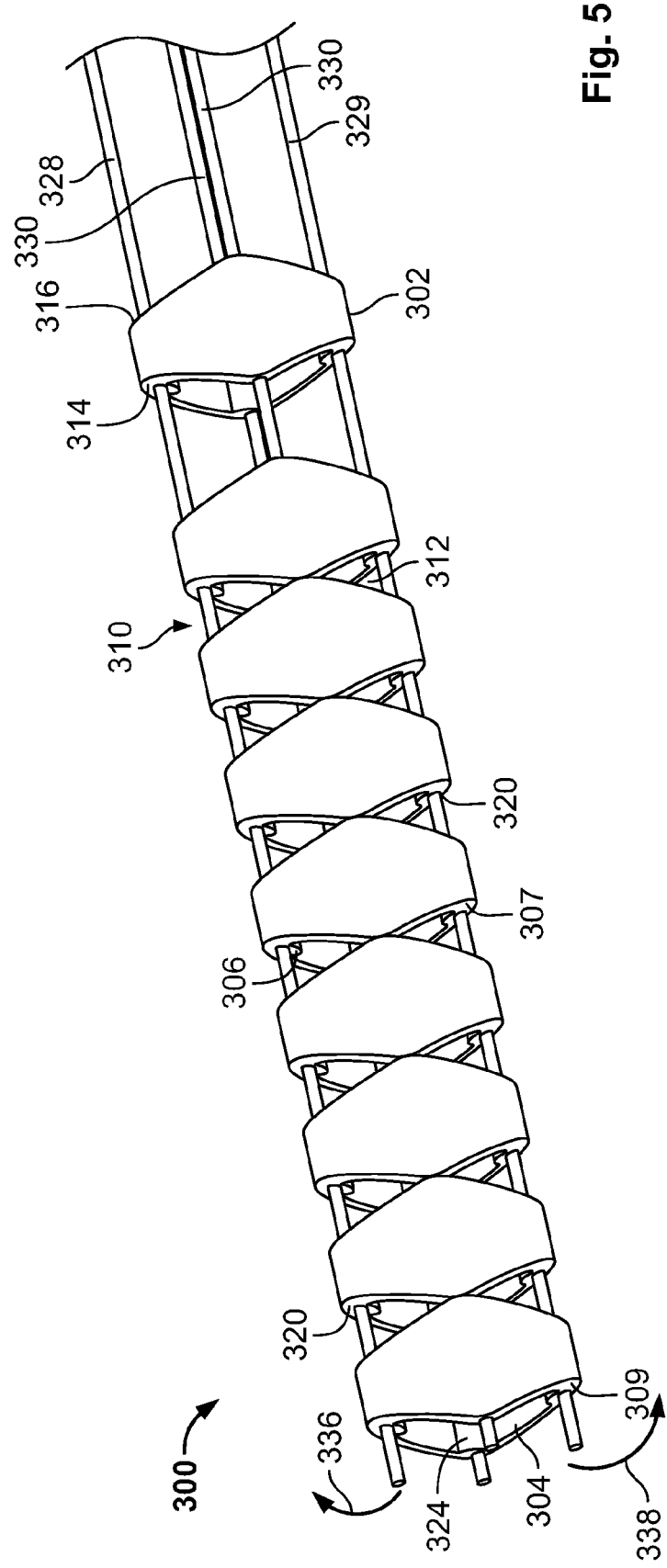
FIG. 5 is a schematic perspective representation of an articulating shaft according to another example.

FIG. 5 illustrates a two-way steerable configuration of a shaft 300 with aligned openings 310, 312 and two pull wires. To this end, the first removed sections or cuts (or openings) 310 and the second removed sections or cuts 312 are symmetric with respect to a diameter interconnecting the neutral axis support wires 330. Consequently, a first steering wire 328 is fed through the steering wire lumen 320 and causes, when actuated, a bending of the shaft 300 in the direction shown by arrow 336. Furthermore, the second steering wire 329 is held in the feed-through openings forming the second steering wire lumen 320. Actuating the second steering wire 329 causes the shaft 300 to bend in the direction 338. The shaft 300 according to this example has the advantage that it is light weight, easy to fabricate and has high pliability in two directions Thus, accurate steering of the catheter system can be achieved with a minimum of components, in this case an MLE, two pull wires and two axial support wires. The segments 302 may be separate components with no connections to adjacent segments.

The reinforcement or axial support wires 330 may for instance be made from steel, Nitinol, or other suitable materials having some elastic properties. The axial support wires 330 may also be referred to as the neutral axis support wires because they stabilize the segments formed by the removed sections or cuts 310, 312 in their alignment and position and are located on the neutral axis of the shaft which is the axis about which the shaft bends and the length of this axis remains constant during articulation of the shaft. For efficient articulation, the neutral axis length must not reduce or compress under the loads applied to the shaft by the steering wires. The neutral axis support wires provide this axial stiffness where the steering loads are higher than the ability of the polymer hinges to resist compression and buckling under this load. When a tensile load is applied, the actuating wire 328, 329 on the respective side shortens and causes the openings 310, 312 on the side of the actuated wire to close, thereby causing the assembly to bend in the direction of those openings 310, 312. The neutral axis support wires 330 arranged in the axial support wire lumens can also bend in order to allow the assembly to move. The axial support wires 330 also prevent the separate segments 302 from moving apart and reinforce the tensile strength of the polymer hinges for non-separate segments to prevent the polymer hinges from breaking under tensile loads.

Figure 6:
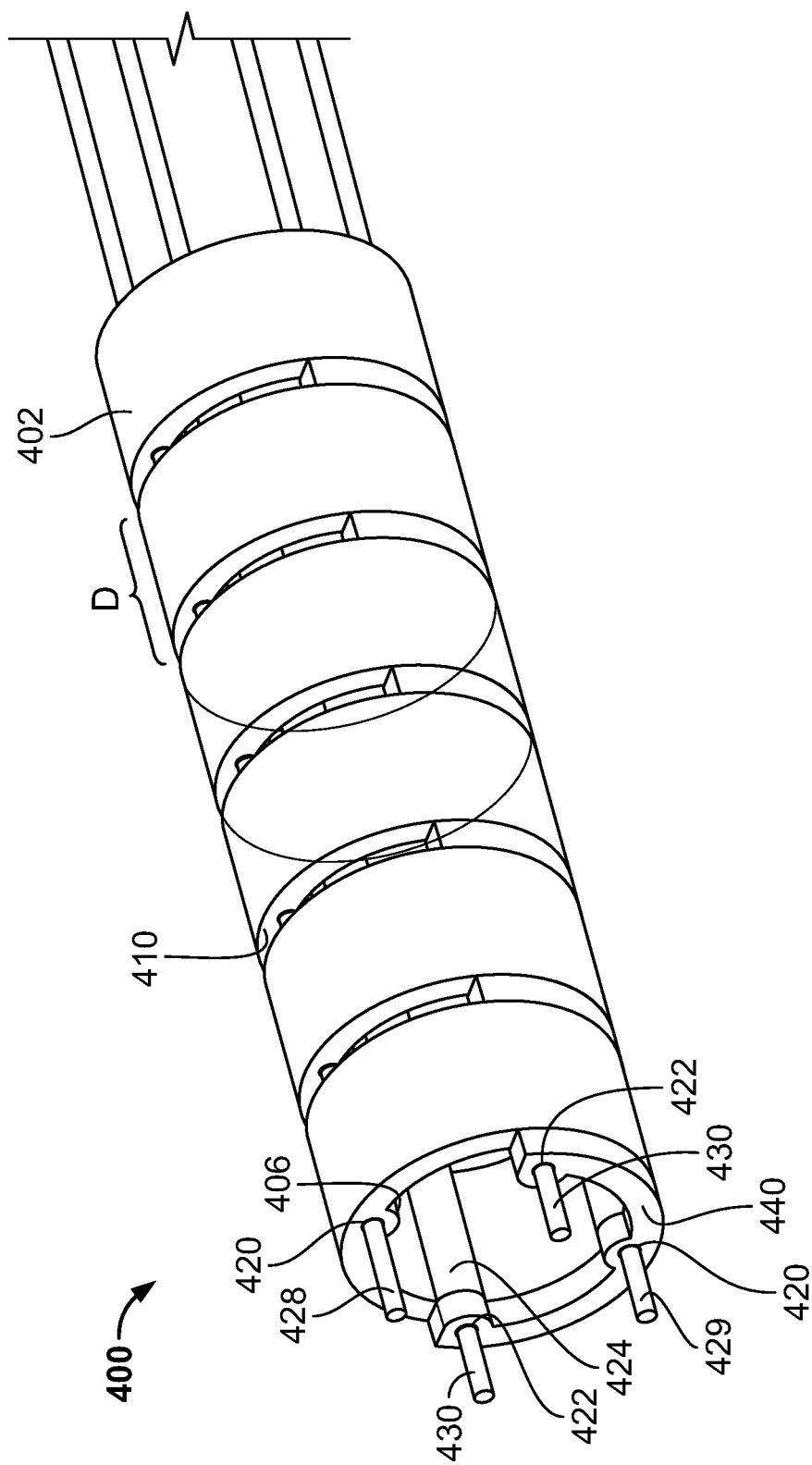
FIG. 6 is a schematic perspective representation of an articulating shaft according to a further example.

FIG. 6 illustrates an example of a one way steerable shaft 400. For this example, the MLE may be cut into segments with cuts essentially perpendicular to the longitudinal MLE axis. Spacers can be assembled on to the axial support wires and between each of the square cut segments. These spacers provide clearance on one or both sides of the assembly to allow the assembly to bend to one or both sides. The spacers can be of cylindrical form. They may be made from thin slices or sections 440 cut from the MLE with material removed to allow bending in one or both directions.

According to this example, each of the separate segments 402 have a uniform radial dimension D around their circumference. In order to enhance pliability, the segments 402 are separated from each other by spacer elements 440 (which may also be referred to as hinges). The spacer elements 440 extend around slightly more than 180° of the shaft's cross section. Thus, the spacer elements 440 form a part of the axial support wire lumens 430 as well as of the steering wire lumen 420, at the same time leaving open removed sections or cuts 410 between adjacent segments 402. The spacer elements 440 may either be loosely attached to the segments 402 allowing the segments to separate from the spacer elements upon actuation or may be firmly attached to an adjacent segment on one side. The proximal faces of the spacer elements 440 may for instance be glued or welded to the distal faces of the segments 402, each individual assembly of 440 and 402 forming a combined segment.

If a two-way steering shaft is desired, the spacers 440 may also be arranged on the upper half and the lower half of the shaft 400 in an alternating manner (not shown in the Figure).

Figure 7:
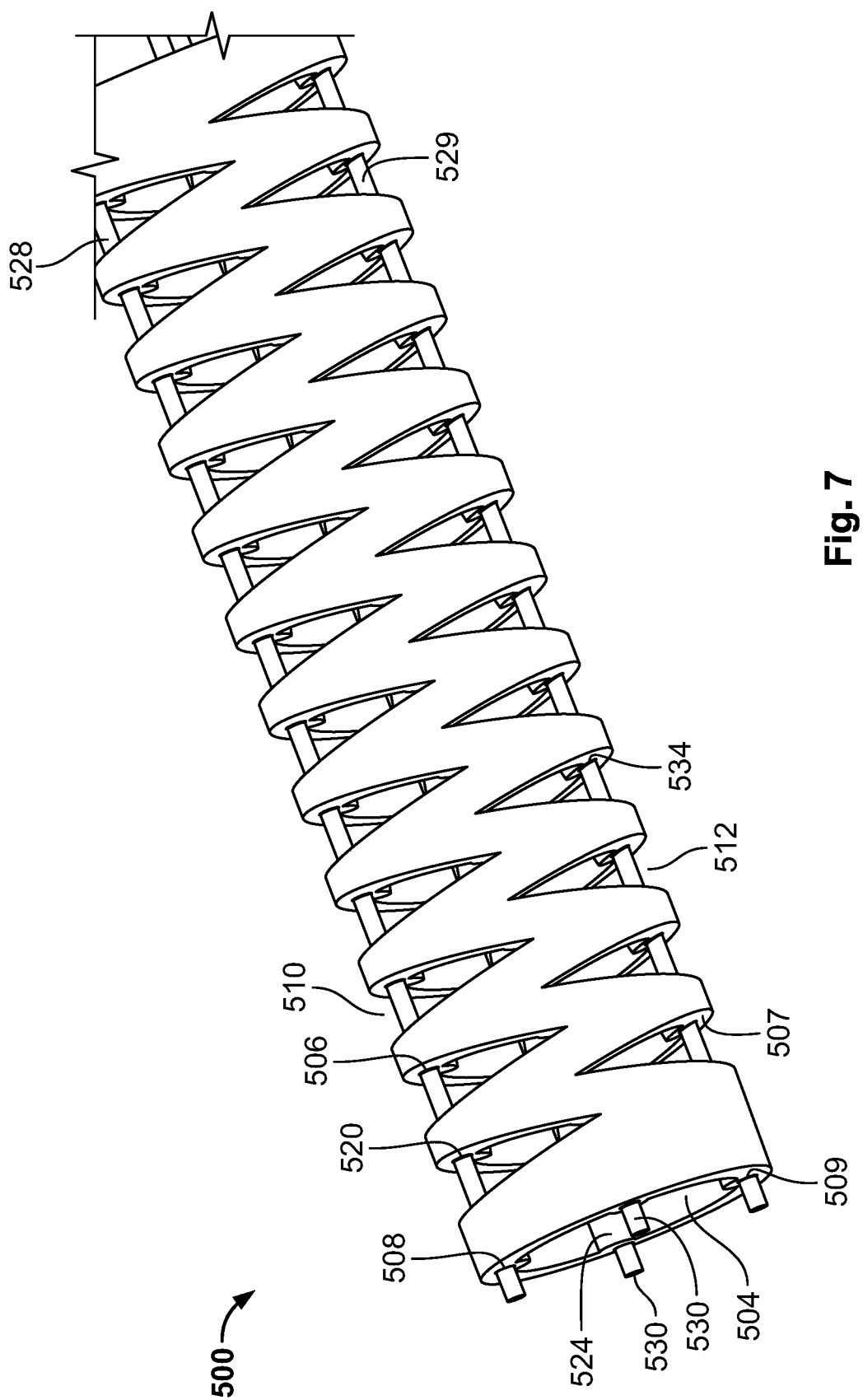
FIG. 7 is a schematic perspective representation of an articulating shaft according to a further example.

FIG. 7 illustrates a variation of an articulating shaft 500, wherein the MLE is provided with radially opposed openings that are not aligned in an axial direction. As shown in FIG. 7, the shaft 500 has a main lumen 504 which extends along the complete length of the shaft 500. According to the example shown in FIG. 7, the articulating shaft 500 comprises first wire support elements 506 with first feed-through openings 508 and second wire support elements 507 with second feed-through openings 509. The feed-through openings 508, 509 are linearly arranged in the longitudinal direction of the shaft 500, so that two segmented lumens 520 for two steering wires 528, 529 are formed. Thus, a two way steerable catheter can be provided using the shaft 500 shown in FIG. 7.

The shaft 500 may be formed as a MLE part with removed sections or cuts 510, 512 cut into the material by means of laser machining or sawing. Similar to the design shown in FIG. 5, the shaft 500 shown in FIG. 7 has removed sections or cuts 512 which are arranged radially opposing to the removed sections or cuts 510, thus allowing a two-way steering of the shaft 500. In contrast to the segmented arrangement of FIG. 5, the second removed sections or cuts 512 are staggered in an axial direction with respect to the first removed sections or cuts 510. This generates a zigzag structure of the outer wall of the shaft 500, which thus has a high pliability, at the same time providing a stable support at the neutral axis. Neutral axis support wires 530 further enhance the stability and increase the shaft torque capability.

Figure 8:
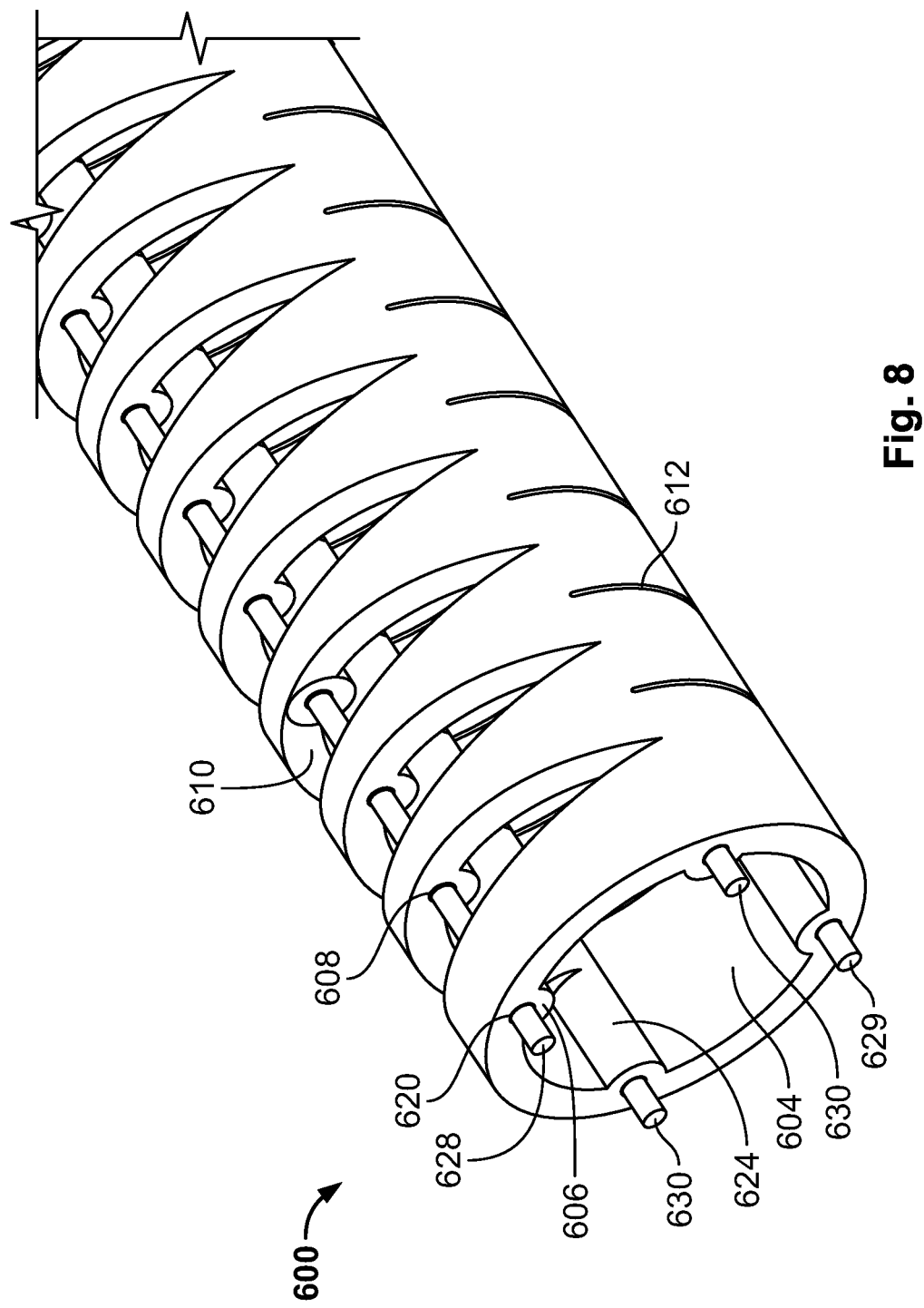
FIG. 8 is a schematic perspective representation of an articulating shaft according to a further example.

FIG. 8 shows a one-way steerable shaft 600 which is fabricated as one integral piece from an MLE. A main lumen 604 extends along the complete length of the shaft 600. The articulating shaft 600 comprises first wire support elements 606 with first feed-through openings 608. The feed-through openings 608 are linearly arranged in the longitudinal direction of the shaft 600, so that a segmented lumen 620 for the steering wire 628 is formed. Corresponding to the design shown in FIG. 1, the second removed sections or cuts 612 are narrow and not wedge shaped like the first removed sections or cuts 610. The second removed sections or cuts 612 thereby only allow opening of the shaft 600 when actuating the steering wire 628. The removed sections or cuts 610, 612 partly intersect the axial support wire lumens 622. However, the walls of the axial support wire lumens 622 may of course also be continuously closed along the longitudinal axis of the shaft 600. When the shaft 600 is bent in a direction toward the feed-through openings 608, the openings 610 close, but also the second removed sections or cuts 612 open, thereby facilitating the bending process. In contrast to the arrangement of FIG. 1, the second removed sections or cuts 612 are not aligned axially with the first removed sections or cuts 610, but are off-set in the axial direction for providing an enhanced mechanical stability of the shaft 600.

Figure 9:
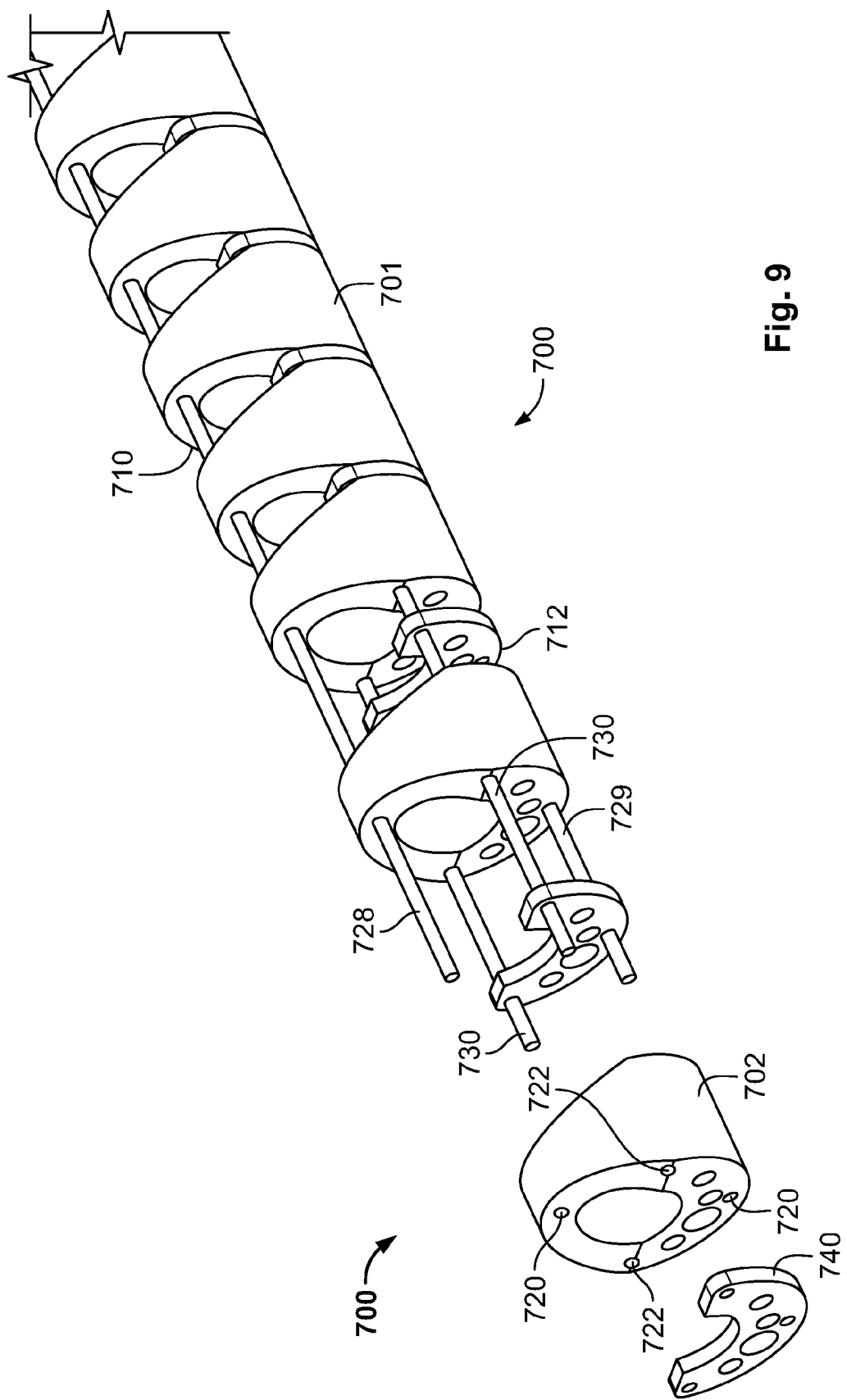
FIG. 9 is a schematic perspective representation of an articulating shaft according to a further example.

Further, as mentioned above, additional lumens for electrical cables or fluid channels can be provided. An example for such a shaft 700 is illustrated in FIG. 9. For this example, the MLE may be cut into segments with wedge shaped first cuts 710 that are slanted at about half of the radius, and second cuts 712, which are essentially perpendicular to the longitudinal MLE axis. Spacers 740 can be assembled on to the axial support wires and between each of the square cut parts of the segments 702. These spacers 740 provide clearance on one or both sides of the assembly to allow the assembly to bend to one or both sides. The spacers can be of cylindrical form. They may be made from thin slices or sections cut from the MLE with material removed to allow bending in one or both directions.

Each of the separate segments 702 are formed as shown in FIG. 4 and are separated from each other by spacer elements 740 (which may also be referred to as hinges). The spacer elements 740 extend around slightly more than 180° of the shaft's cross section. Thus, the spacer elements 740 form a part of the axial support wire lumens 730 as well as of the steering wire lumen 720, at the same time leaving open removed sections or cuts 710 between adjacent segments 702. The spacer elements 740 may either be loosely attached to the segments 702 allowing the segments to separate from the spacer elements 740 upon actuation or may be firmly attached to the segments 702. The spacer elements 740 may for instance be glued or welded to an adjacent segment on one side. The proximal faces of the spacer elements 740 may for instance be glued or welded to the distal faces of the segments 702, each individual assembly of 740 and 702 forming a combined segment.

Figure 10:
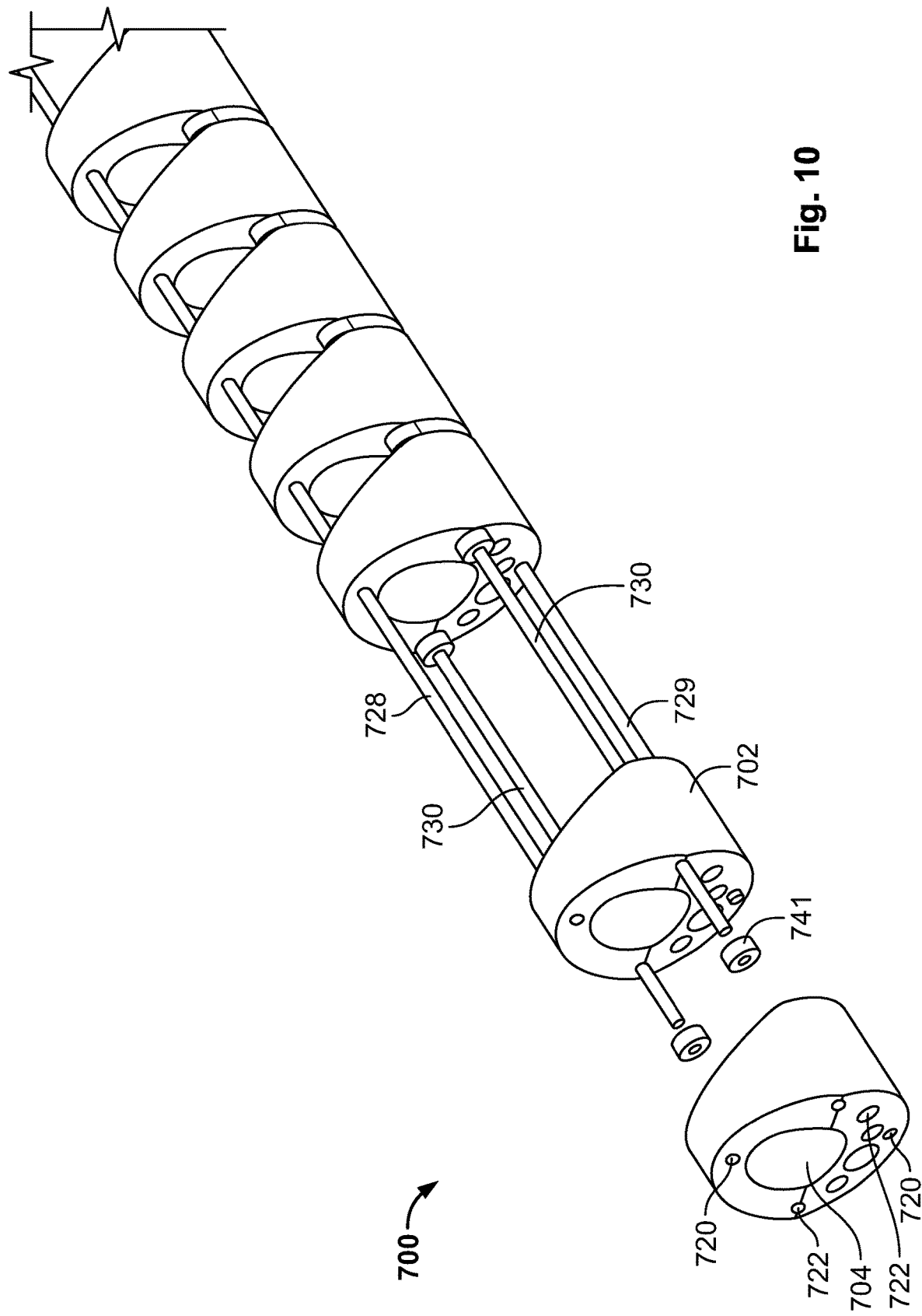
FIG. 10 is a schematic perspective representation of an articulating shaft according to a further example.

An alternative example of the actuating shaft 700 is shown in FIG. 10. Instead of using the relatively large spacers 740 fabricated for instance from the MLE, the segments 702 of the shaft 700 may also by distanced from each other by simple cylindrical spacers 741, which only surround the neutral support wires 730.

Figure 11:
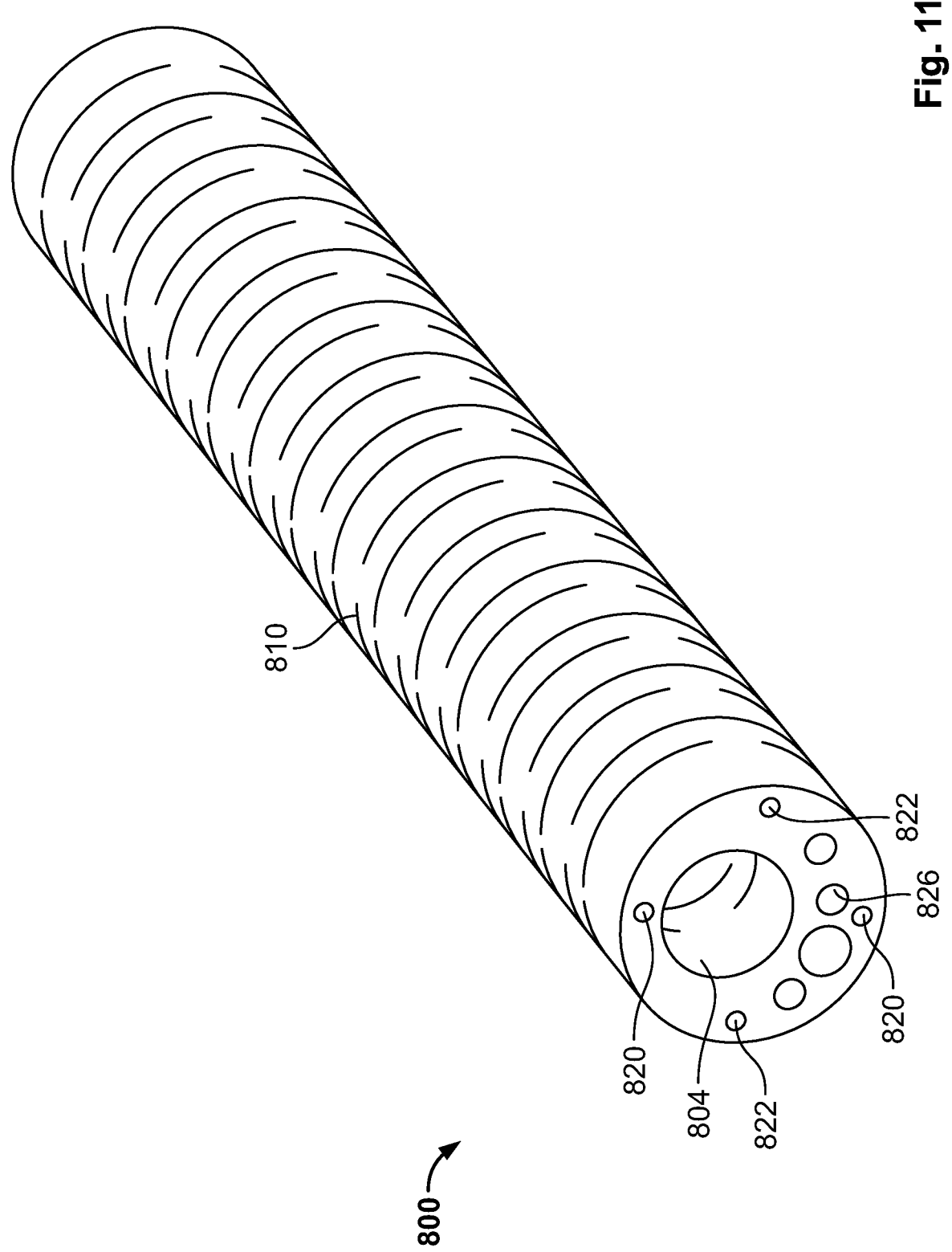
FIG. 11 is a schematic perspective representation of an articulating shaft according to a further example.

According to the present disclosure, the articulating shaft does not necessarily have to be shaped identical along its complete longitudinal extension. For instance, the geometries explained with reference to FIGS. 1-10 may only be used for the distal region of the shaft, where a high flexibility is needed. The proximal section of the shaft may be shaped differently. For instance, as shown in FIG. 11, a proximal section of the shaft 800 can be fabricated from a MLE or fabricated from the same MLE as the distal articulating section and can be provided with a plurality of incisions 810 to increase the shaft's flexibility. The size, geometry, and pitch of the incisions 810 may vary along the longitudinal length in order to modify the flexibility of the sheath 800 along its length.

The articulating shaft may be constructed from a single MLE with distal cut pattern arrangements as previously outlined to allow articulation in one or more directions of the distal section and different cut patterns designed to give varying flexibilities from distal section to proximal end or no further modifications to the MLE for the mid and proximal sections to result in a complete distal to proximal shaft constructed with a minimum of simple and low cost components, a single MLE, one to two pull wires and one to two axial support wires.

In all the shown examples, the shaft has an essentially circular outer contour. However, any other cross-sectional outline may also be chosen, for instance an oval or polygonal contour. As shown here, also all openings forming a lumen have a circular cross-section. This is not necessarily the case; any other suitable cross-section, e. g. oval or polygonal, may also be used.

Figure 12:
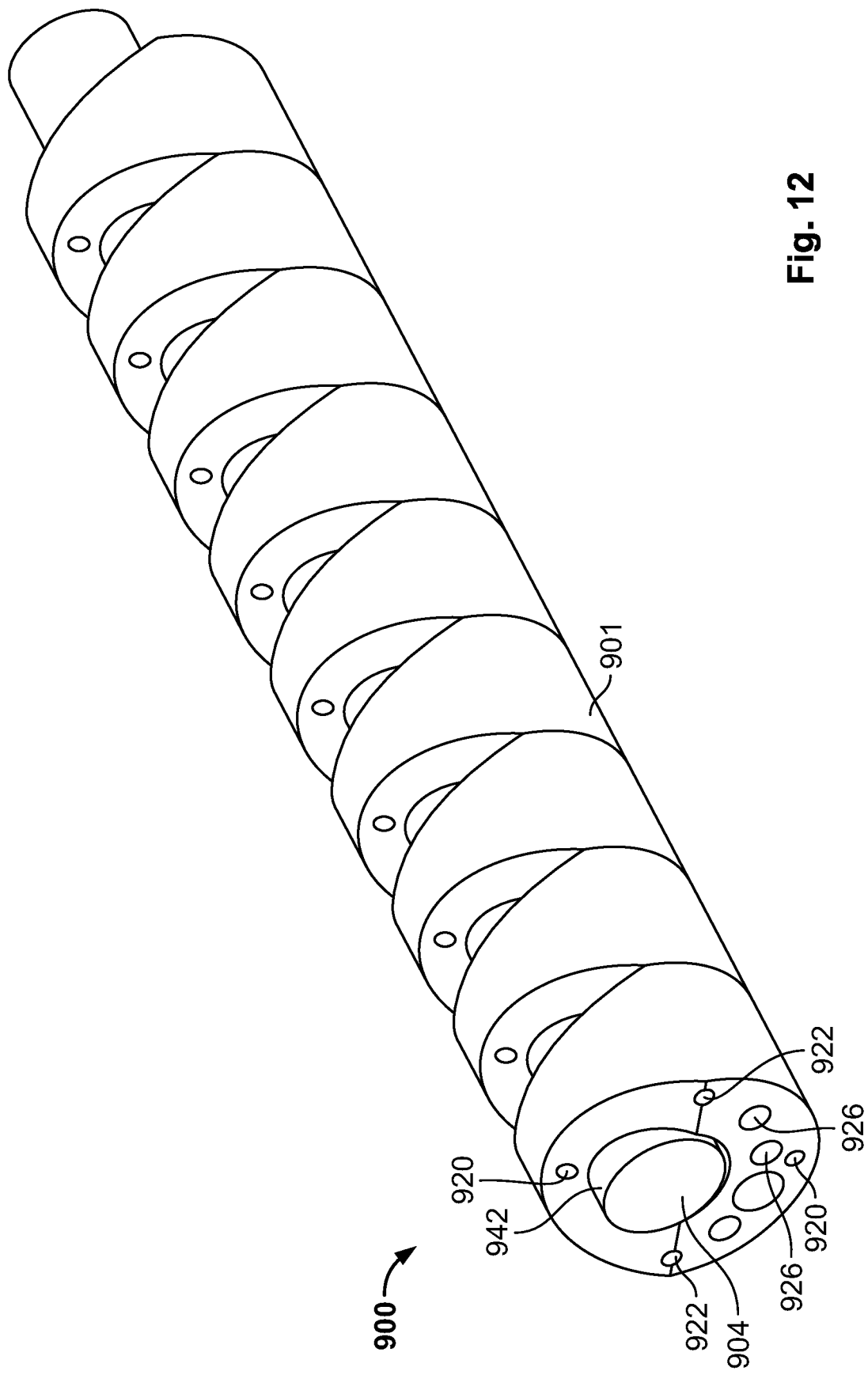
FIG. 12 is a schematic perspective representation of an articulating shaft according to a further example.

Furthermore, in order to create one or more fluid tight channels, at least one of the lumens may be lined with a tube e. g. fabricated from a polymer. FIG. 12 illustrates a shaft 900 wherein a polymer tube 942 is inserted into the main lumen 904. Of course, alternatively or additionally, also one or more of the additional lumens 926 may be provided with a fluid-tight liner 942.

Figure 13:
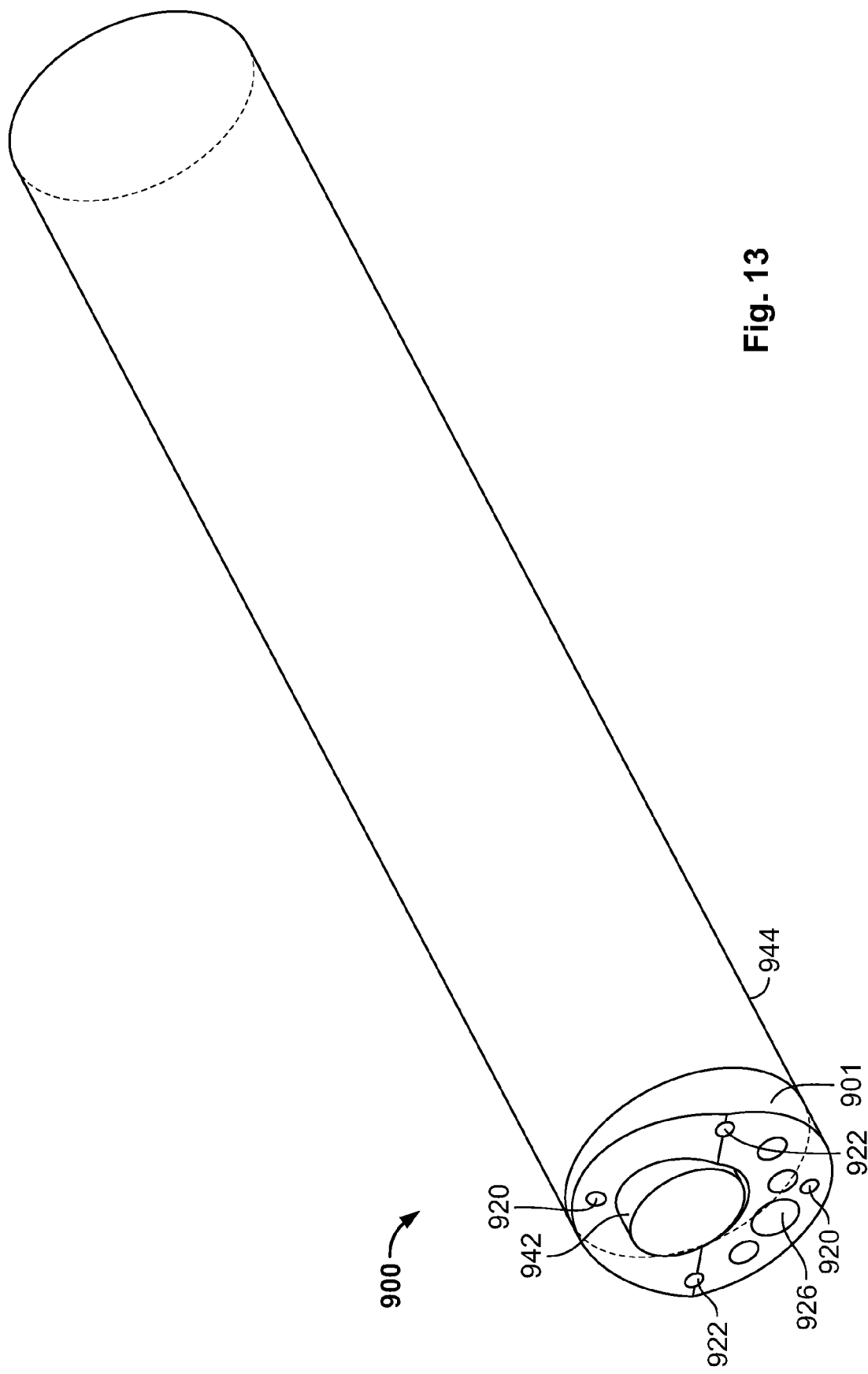
FIG. 13 is a schematic perspective representation of an articulating shaft according to a further example.

Additionally or alternatively, as shown in FIG. 13, a polymer jacket 944 may be fitted over the outer surface of the multi lumen extrusion in order to provide a smooth surface for contact with anatomy and to protect the other components of the completed device from external substances, e. g. bodily fluids. The jacket 944 may comprise a simple extruded polymer tube, a braid or coil reinforced tube, or any other suitable construction.

In summary, the present invention provides an articulating shaft design based on a multi lumen extrusion. A multi lumen extrusion may for instance be made from a hard polymer material or other suitable materials. This extrusion part may have articulation lumens arranged 180° apart and close to the outer surface. Wires or cables can be fed through these lumens. Removed sections or cuts are arranged to cross these articulation lumens. The extrusion may have neutral axis support lumens arranged close to the surface and at 180° to each other. These lumens may advantageously be arranged at 90° to the articulation lumens.

Axial support wires may be assembled into these lumens. These can be steel or Nitinol or other suitable materials with some elastic properties. These axial support wires can also be referred to as the neutral axis support wires. Articulation wires are assembled into the articulation lumens. When these wires are attached to the distal end of the assembly and a tensile load applied, then the wire (or cable) shortens. This causes the openings to close, causing the assembly to bend in the direction of the openings. The neutral axis support wires bend to allow the assembly to bend. These axial support wires also carry some articulation axial load. The wires keep the segments in alignment and position. The wires also keep tension on the assembly, preventing the segments from separating.

According to embodiment, the segments can be configured in a multitude of ways, with single-way and two-way steering possible, with aligned openings (leading to separate segments) or alternating segments giving a single piece design. Multiple lumens can be included to carry various elements. The openings can be mechanically cut or laser cut, by means of a gang saw, grinder, blades, or other methods. Individual segments can be cut with square faces and hinge pieces assembled between the square segments. For one-way steering, the redundant steering lumen can be used for an additional support wire to enhance torque performance. This wire is fixed at the distal end only and is free to move axially as the part is articulated.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An articulating shaft for a steerable catheter system, comprising:
    a tubular body with a longitudinal central axis, the tubular body having at least one main lumen with a distal end and a proximal end;
    at least one wire support element forming at least one wire lumen sized to support at least one actuating wire, the at least one main lumen and the at least one wire lumen are integrally formed in an extrusion part having a uniform hardness in an axial and a radial direction; and
    a plurality of removed sections or cuts which extend in a radial direction and are distanced from each other in an axial direction, the shaft has a plurality of discrete segments aligned along the longitudinal central axis, each of the segments has a first and a second lateral face delimiting the segment in an axial direction, at least one of the lateral faces has a lower half that is orthogonal to the longitudinal central axis and an upper half that is planar and at least partly inclined to the longitudinal central axis at an angle different from 90°.

2. The articulating shaft according to claim 1, further comprising a flexible outer jacket encompassing the tubular body.

3. The articulating shaft according to claim 1, wherein the at least one main lumen comprises a flexible tube inserted into the tubular body.

4. The articulating shaft according to claim 1, wherein segments are separated from each other in the axial direction the plurality of removed sections or cuts.

5. The articulating shaft according to claim 4, wherein the removed sections or cuts intersect an inner wall of the main lumen, each of the removed sections or cuts extend by at least 180° in a radial direction around the body.

6. The articulating shaft according to claim 1, wherein the discrete segments are aligned with at least one separate spacer element between each pair of adjacent segments.

7. The articulating shaft according to claim 6, wherein the segments each have the shape of a straight circular cylinder and the spacer elements have an essentially C-shaped radial outline, leaving axially distanced removed sections or cuts between the segments.

8. The articulating shaft according to claim 1, wherein the shaft has a circular radial outline and the removed sections or cuts have a wedge-shaped tapered outline, the at least one wire support elements is located in a region where the removed sections or cuts have their minimum axial dimension.

9. The articulating shaft according to claim 1, wherein the plurality of removed sections or cuts include a plurality of first removed sections or cuts and the at least one wire support element includes a plurality of first wire support elements, the plurality of first removed sections or cuts separating the plurality of first wire support elements from each other.

10. The articulating shaft according to claim 1, wherein the at least one main lumen is arranged concentrically within an outline of the shaft.

11. The articulating shaft according to claim 1, wherein the main lumen is arranged within an outline of the shaft with its central axis being distanced from the longitudinal central axis of the shaft.

12. The articulating shaft according to claim 1, wherein the at least one wire lumen of the at least one wire support element comprises a tube shaped wire lumen having an inner wall and an outer wall, the outer wall being partly formed by an inner wall of the main lumen.

13. The articulating shaft according to claim 1, wherein the tubular body is fabricated from a single multilumen extrusion.

14. A steerable wire guiding catheter system, comprising:
    an articulating shaft, including:
        a tubular body with a longitudinal central axis, the tubular body having at least one main lumen with a distal end and a proximal end;
        at least one wire support element forming at least one wire lumen adapted to support at least one actuating wire, the at least one main lumen and the at least one wire lumen are integrally formed in an extrusion part having a uniform hardness in an axial and a radial direction; and
        a plurality of removed sections or cuts which extend in a radial direction and are distanced from each other in an axial direction, the shaft has a plurality of discrete segments aligned along the longitudinal central axis, each of the segments has a first and a second lateral face delimiting the segment in an axial direction, at least one of the lateral faces has a lower half that is orthogonal to the longitudinal central axis and an upper half that is planar and at least partly inclined to the longitudinal central axis at an angle different from 90°; and at least one actuating wire passing through the at least one wire lumen and having a proximal end and a distal end, the actuating wire being fixable so that pulling the actuating wire effects steering of the catheter.

* * * * *